(12) United States Patent
Meehan et al.

(10) Patent No.: US 12,514,473 B2
(45) Date of Patent: Jan. 6, 2026

(54) SYSTEM AND METHOD FOR CALIBRATING FOR ERRORS DEPENDENT UPON SPECTRAL CHARACTERISTICS OF TISSUE

(71) Applicant: Covidien LP, Mansfield, MA (US)

(72) Inventors: Christopher J. Meehan, Denver, CO (US); Jacob D. Dove, Lafayette, CO (US); Chekema N. Prince, Morganville, NJ (US); Scott J. Mcgonigle, Loanhead (GB); Keith A. Batchelder, Boulder, CO (US); David M. VandeRiet, Lafayette, CO (US); Linden A. Reustle, Milliken, CO (US)

(73) Assignee: Covidien LP, Mansfield, MA (US)

( * ) Notice: Subject to any disclaimer, the term of this patent is extended or adjusted under 35 U.S.C. 154(b) by 672 days.

(21) Appl. No.: 17/958,788

(22) Filed: Oct. 3, 2022

(65) Prior Publication Data

US 2023/0103406 A1 Apr. 6, 2023

Related U.S. Application Data

(60) Provisional application No. 63/251,337, filed on Oct. 1, 2021.

(51) Int. Cl.
*A61B 5/1455* (2006.01)
*A61B 5/00* (2006.01)
*A61B 5/1495* (2006.01)
*A61B 5/08* (2006.01)

(52) U.S. Cl.
CPC ........ *A61B 5/14551* (2013.01); *A61B 5/1495* (2013.01); *A61B 5/6826* (2013.01); *A61B 5/08* (2013.01)

(58) Field of Classification Search
CPC . A61B 5/1455; A61B 5/14551; A61B 5/6814; A61B 5/6815; A61B 5/6826; A61B 5/1495; A61B 5/7221
See application file for complete search history.

(56) References Cited

U.S. PATENT DOCUMENTS

| | | | | |
|---|---|---|---|---|
| 7,142,901 B2* | 11/2006 | Kiani | ................. | A61B 5/14551 600/323 |
| 7,590,439 B2* | 9/2009 | Raridan | ............. | A61B 5/14552 600/344 |
| 8,311,601 B2* | 11/2012 | Besko | ................. | A61B 5/6826 600/323 |
| 9,924,874 B2* | 3/2018 | Sato | ...................... | A61B 5/1455 |
| 10,327,710 B2* | 6/2019 | Ulrich | ................. | A61B 5/1495 |

(Continued)

*Primary Examiner* — Eric F Winakur
(74) *Attorney, Agent, or Firm* — Draft Masters IP, LLC

(57) ABSTRACT

The present disclosure provides systems and methods for calibrating for errors dependent upon spectral characteristics of tissue for a medical device by estimating a spectral characteristic of tissue providing error due to scattering or absorption of emitted light based upon operating the sensor in reflectance mode to generate a first $SpO_2$ reading and estimating error due to spectral characteristics of skin therefrom, operating the sensor in transmissive mode to generate a second SpO2 reading, and applying a correction to a pulse oximetry transmissive mode measurement to correct for the error dependent upon the estimated spectral characteristic of tissue.

20 Claims, 5 Drawing Sheets

(56) References Cited

U.S. PATENT DOCUMENTS

| | | | |
|---|---|---|---|
| 2003/0176776 A1* | 9/2003 | Huiku | A61B 5/1495 600/322 |
| 2010/0076319 A1* | 3/2010 | Mannheimer | A61B 5/14551 600/476 |
| 2021/0169382 A1* | 6/2021 | De Benedetto | A61B 5/1495 |
| 2023/0103378 A1 | 4/2023 | Mcgonigle et al. | |

* cited by examiner

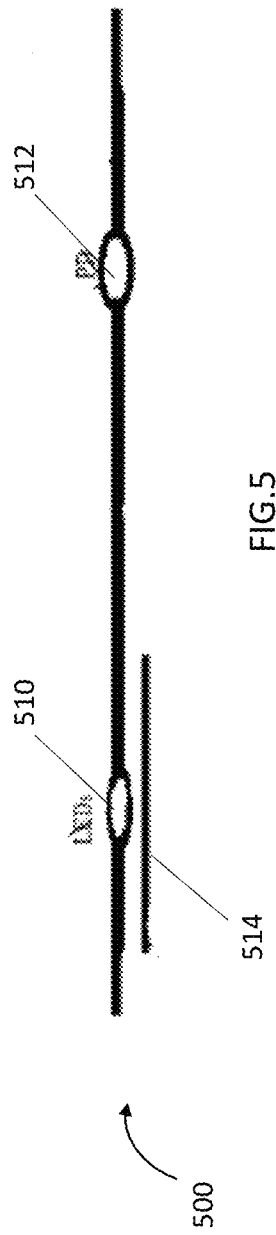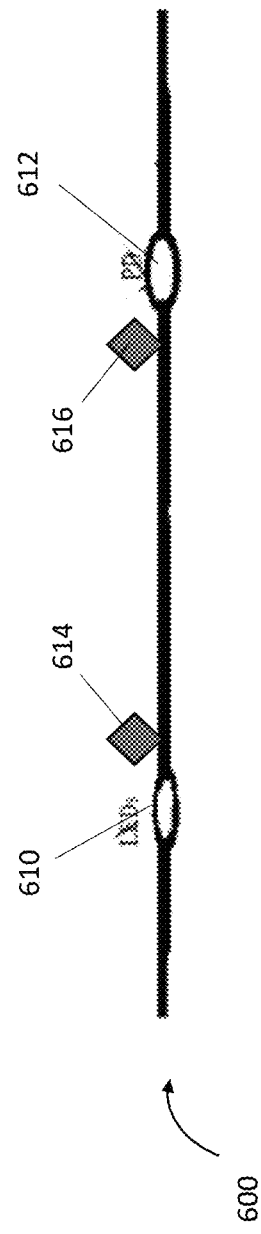

SYSTEM AND METHOD FOR CALIBRATING FOR ERRORS DEPENDENT UPON SPECTRAL CHARACTERISTICS OF TISSUE

CROSS-REFERENCE TO RELATED APPLICATIONS

This application claims the benefit of U.S. Provisional Application Ser. No. 63/251,337, filed Oct. 1, 2021, the disclosure of which is incorporated herein by reference in its entirety.

FIELD

The present disclosure relates generally to medical devices, and more particularly to calibration to correct for errors in medical device measurements due to spectral characteristics in tissue, for example for measurements using pulse oximeters to correct for scattering or absorption errors due to skin pigmentation.

BACKGROUND

In the field of medicine, doctors often desire to monitor certain physiological characteristics of their patients. Accordingly, a wide variety of devices have been developed for monitoring many such physiological characteristics. Such devices provide doctors and other healthcare personnel with the information they need to provide the best possible healthcare for their patients. As a result, such monitoring devices have become an indispensable part of modern medicine.

One technique for monitoring certain physiological characteristics of a patient uses attenuation of light to determine physiological characteristics of a patient. This is used in pulse oximetry, and the devices built based upon pulse oximetry techniques. Light attenuation is also used for regional or cerebral oximetry. Oximetry may be used to measure various blood characteristics, such as the oxygen saturation of hemoglobin in blood or tissue, the volume of individual blood pulsations supplying the tissue, and/or the rate of blood pulsations corresponding to each heartbeat of a patient. The signals can lead to further physiological measurements, such as respiration rate, glucose levels or blood pressure.

Pulse oximetry is often used to noninvasively measure arterial blood oxygenation. To measure blood oxygenation, two optical sources, typically light-emitting-diodes (LEDs), may be used to inject light into the tissue. A photodiode is used to capture the light after propagating through blood perfused tissue. During a cardiac cycle, the amount of blood in the optical path changes which changes the amount of absorbed light. As more light is absorbed, the photodiode produces less photocurrent. Hence, during the cardiac cycle, the photocurrent from the photodiode is modulated. As blood oxygenation changes, the relative change in the modulated light at two distinct wavelengths changes. This relative change in the modulated photocurrent is processed (e.g., signal conditioning, various algorithms) by the oximetry unit to estimate the arterial functional oxygenation ($SpO_2$).

The present disclosure recognizes that physiological factors of tissue vary, providing varying amounts of light scattering or absorption between different tissue types, causing error in the measurement. For example, the spectrum of skin pigmentations can result in LED light for a pulse oximeter being scattered and absorbed differently. Thus, skin pigmentation (or other characteristics of tissue causing light scattering or absorption (spectral characteristics of tissue), e.g., density, damage, etc.)) can contribute to error in the $SpO_2$ measurement.

What is needed in the art are improved techniques to increase accuracy of pulse oximeter sensor measurements that accounts for error dependent upon spectral characteristics of tissue.

SUMMARY

The techniques of this disclosure generally relate to correction of errors in medical device measurements to spectral characteristics in tissue, for example for measurements using pulse oximeters to calibrate/correct for scattering or absorption errors such as skin pigmentation.

In exemplary embodiments, a photoplethysmography (PPG) sensor, such as a pulse oximeter, includes emitters for least two wavelengths of light, such as one red light source and at least one infrared source, which may be, e.g., LEDs. A comparison of the detected signals for those two wavelengths of light can provide an indication of a degree of scattering or absorption by target tissue and provide the basis for correction of errors dependent thereon.

In further exemplary embodiments, systems and methods are provided for calibrating for errors dependent upon spectral characteristics of tissue for a medical device by estimating a spectral characteristic of tissue providing error due to scattering or absorption of emitted light based upon operating the sensor in reflectance mode to generate a first $SpO_2$ reading and estimating error due to spectral characteristics of skin therefrom, operating the sensor in transmissive mode to generate a second SpO2 reading, and applying a correction to a pulse oximetry transmissive mode measurement to correct for the error dependent upon the estimated spectral characteristic of tissue.

In further exemplary embodiments, a correction for error dependent upon the estimated spectral characteristic of tissue includes a metric based on the attenuated signals, the ratio of the attenuated signals, and the saturation estimate. The metric may be used to correct calibration coefficients such as the gamma coefficients or may be used to correct the saturation calculation directly.

In further exemplary embodiments, the reflectance mode is provided by a removable or attenuating calibration fixture, e.g., that includes that includes: a transparent material with a reflective coating promoting internal reflectance, having plural apertures through the reflective coating to provide transmission of the optical signal from the emitter through the transparent material, off of the skin and to the detector; light pipes or fiber optics; internal reflectors configured to coerce light to interrogate tissue prior to the detector; or a disposable or attenuating liner, adhesive or gel.

In further exemplary embodiments, the sensor emits at least three wavelengths of light, with at least the third wavelength of light being sensitive to skin pigmentation or other spectral tissue characteristics that cause scattering or absorption of light, and wherein correction is applied based upon a level of difference between two or more estimates of $SpO_2$ using at least the third wavelength of light.

In further exemplary embodiments, at least a third wavelength is generated by one of: including at least a third LED; driving two LEDs at high and low current states, in which there is nominal wavelength shift for the two LEDs between these high and low current levels; and including an adhesive liner, an adhesive layer, or a gel layer with optical characteristics that result in a shifting of peak red and IR LED emitted wavelengths used in a calibration step or interval, with a subsequent measurement after removal or attenuation of the liner or layer.

In further exemplary embodiments, the amount of light that interacts with the skin is modulated manually or optically to determine skin pigmentation, e.g., with manual modulation including use of an acoustic signal, force on the sensor, or movement of a patient's body, and with optical modulation including one or more of: plural LEDs; lenses to control optical emission; and removable layers placed over LEDs of the sensor to redirect emitted light to a different angle.

In further exemplary embodiments, the medical device includes a sensor having at least a third LED configured to emit a wavelength above 1000 nm, as well as a second detector responsive to wavelengths above 1000 nm, wherein the reflected signal is normalized for a hemoglobin measurement to correct for errors due to scattering or absorption losses of tissue.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 5 is an exemplary schematic view of a sensor with a removable liner;

FIG. 6 is an exemplary schematic view of a sensor with piezo-electric crystals;

DETAILED DESCRIPTION

Figure 1:
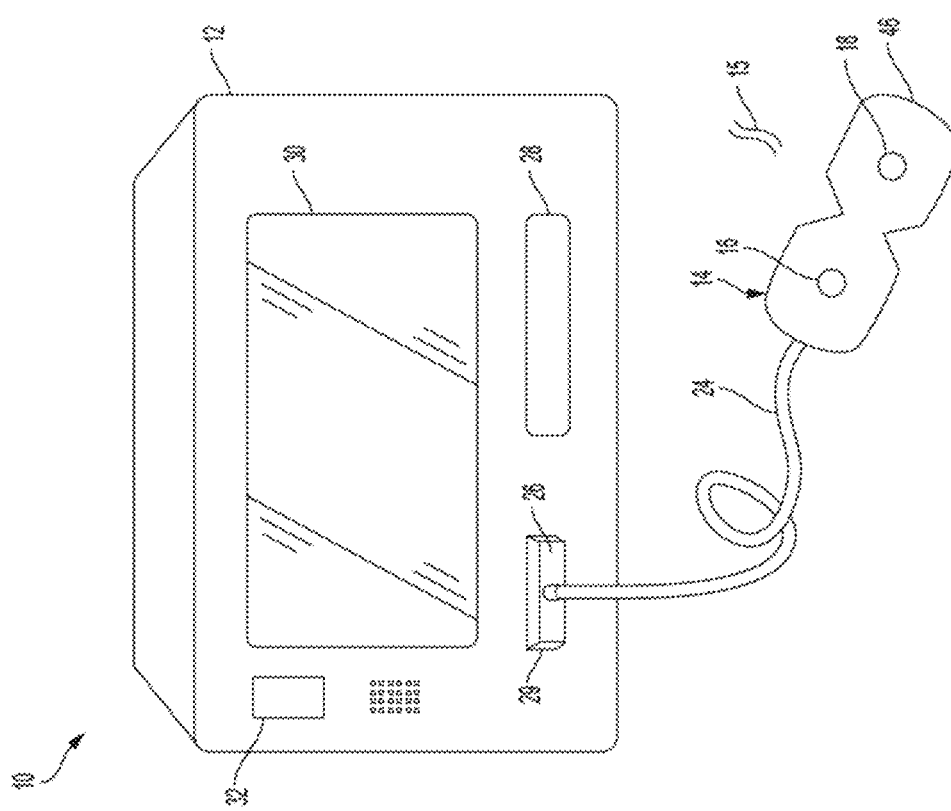
FIG. 1 illustrates a perspective view of an exemplary patient monitoring system including a patient monitor and a patient monitoring sensor, in accordance with an embodiment.

The present disclosure describes systems and methods for calibration/correction of errors in medical device measurements, wherein at least one spectral characteristic of tissue are estimated or measured to correct for error due to scattering or absorption of light by tissue. As will be described in more detail below, the present disclosure provides systems and methods for calibrating/correction of errors for photoplethysmography (PPG) measurements, and in exemplary embodiments, for pulse oximetry measurements, wherein at least one spectral characteristic of tissue are estimated or measured according to a comparison of detection of signals by light sources emitting of at least two different wavelengths of light.

As we have noted above, oximetry is used in the clinical setting to noninvasively measure characteristics of the blood. For example, pulse oximetry typically is used to estimate arterial blood oxygenation. To estimate blood oxygenation, two optical sources, typically light-emitting-diodes (LEDs), are used to inject light into the tissue. A photodiode is used to capture the light after propagating through blood perfused tissue. During a cardiac cycle the amount of blood in the optical path changes which changes the amount the light that is absorbed. As more light is absorbed, the photodiode produces less photocurrent. Hence, during the cardiac cycle, the photocurrent form the photodiode is modulated. As blood oxygenation changes, the relative change in the modulated light at two distinct wavelengths changes. This relative change in the modulated photocurrent is processed (e.g. signal conditioning, various algorithms) by the oximetry unit to estimate the arterial functional oxygenation ($SpO_2$).

As $SpO_2$ is measured optically, physiological factors that scatter or absorb light differently, within the spectral bandwidth of interest, can cause error. Specifically, differences in tissue characterization, e.g., skin pigmentation, skin density, skin abnormalities or scarring, etc., can result in the LED light being scattered and absorbed differently. Hence, such tissue characteristics can contribute to error in the $SpO_2$ estimate. With specific regard to skin pigmentation, more darkly pigmented skin can result in $SpO_2$ readings, e.g., up to or above 1-3 points different (depending on blood oxygen saturation) than more lightly pigmented skin due to the difference in tissue characteristics.

Exemplary embodiments provide for estimation of such physiological factors or tissue characteristics that cause such scattering or absorption of one or more wavelengths of light. For purposes of this disclosure, we describe various techniques for estimation of physiological factors or tissue characteristics causing such scattering or absorption by measuring an optical signal reflected off of (or transmitted through) the skin of the patient.

As is used herein, the term "reflected" refers to an arrangement wherein an emitter and a detector are on the same side of tissue, as opposed to "transmission", e.g., used in digit sensors where the emitter and detector are on opposite sides.

For purposes of illustration, an exemplary tissue characterization (skin pigmentation) will be discussed herein. However, it should be recognized that any tissue characterization that causes scattering or absorption of one or more wavelengths of light are relevant to the present discussion of correction of error dependent thereon.

We also refer to the co-owned U.S. patent application entitled "SYSTEM AND METHOD FOR CORRECTING FOR ERRORS DEPENDENT UPON SPECTRAL CHARACTERISTICS OF TISSUE", filed concurrently herewith, the entire contents of which are incorporated herein by reference, which describes exemplary mechanisms for estimating and correcting for error due to scattering or absorption due to spectral tissue characteristics.

For examples relating to pigmentation, one indicator may be related to a correlation between dark or very dark pigmentation and one or more relatively lower Red signal intensity levels (e.g., a normalized LED signal level ("nAvs")) detected by a detector versus one or more Infra-Red signal intensity levels detected by a detector (the same or different detector, dependent upon design, detector sensitivity, etc.). Such indicator(s) may then be used to provide one or more correction factors/adjustments/coefficients/etc., which may modify or be applied in addition to other correction factors, e.g., existing gamma or other coefficients, or other correction factors related to correction of signal outside of correction for physiological factors or tissue characteristics that cause such scattering or absorption of one or more wavelengths of light. For example, power ratios, gamma or other calibration coefficients, equations, etc., may be used or modified in exemplary embodiments to correct the measured signal(s) or to otherwise adjust for such determined errors in measurement, which may include to SpO$_2$ values.

In an exemplary embodiment, a ratio of Red$_{DC}$ to IR$_{DC}$ (Red$_{DC}$/IR$_{DC}$) is calculated, with IR$_{DC}$ being the gain normalized infrared signal intensity in nAvs (equation (1), below). In further embodiments, the SpO$_2$ estimate is also used in the ratio, for example according to equations (2) and (3), in the paragraph below.

These metrics may be used to indicate a likelihood that the subject is darkly pigmented based on thresholds derived from historic training data. In exemplary embodiments, each metric is averaged over a period of time, for example with a minimum of about one to several seconds (e.g., 2 to 30 seconds, 4 to 20 seconds, 5 to ten seconds, etc.).

$$\text{Ratio} = \text{Red}_{DC}/\text{IR}_{DC} \qquad (1)$$

$$\text{Ratio} = \text{SpO}_2/(\text{Red}_{DC}/\text{IR}_{DC}) \qquad (2)$$

$$\text{Ratio} = \text{SpO}_2{}^2/(\text{Red}_{DC}/\text{IR}_{DC}) \qquad (3)$$

In further exemplary embodiments, in ratios (2) and (3), the SpO$_2$ term may be substituted for the ratio of ratios "RoR" equation (i.e., (Red$_{AC}$/Red$_{DC}$)/(IR$_{AC}$/IR$_{DC}$)).

For clarification, the term "nAvs" relates to nanoamperes of photocurrent received by the photodetector from the LED (after cancelling ambient light). The "v" within "nAvs" stands for "virtual" and refers to what the photocurrent would be were the LED current at a nominal current, e.g., 50 mA. This provides a metric of how light absorbing a sensor site is. "nAvs" refers to plural signals demultiplexed from multiple light sources (LED wavelengths), whereas the singular (without the "v") is "nAI", where "I" stands for "referred to input". The above serves to emphasize that normalization is provided for the current drive, which is standardized. Other details related to the above are provided, which has been incorporated by reference herein.

FIG. 1 illustrates an embodiment of a patient monitoring system 10 that includes a patient monitor 12 and a sensor 14, such as a pulse oximetry sensor, to monitor physiological parameters of a patient. By way of example, the sensor 14 may be a NELLCOR™, or INVOS™ sensor available from Medtronic (Boulder, CO), or another type of oximetry sensor. Although the depicted embodiments relate to sensors for use on a patient's fingertip, toe, or earlobe, it should be understood that, in certain embodiments, the features of the sensor 14 as provided herein may be incorporated into sensors for use on other tissue locations, such as the forehead and/or temple, the heel, stomach, chest, back, or any other appropriate measurement site.

In the embodiment of FIG. 1, the sensor 14 is a pulse oximetry sensor that includes one or more emitters 16 and one or more detectors 18. For pulse oximetry applications, the emitter 16 transmits at least two wavelengths of light (e.g., red and/or infrared (IR)) into a tissue of the patient. For other applications, the emitter 16 may transmit 3, 4, or 5 or more wavelengths of light into the tissue of a patient. The detector 18 is a photodetector selected to receive light in the range of wavelengths emitted from the emitter 16, after the light has passed through the tissue. Additionally, the emitter 16 and the detector 18 may operate in various modes (e.g., reflectance or transmission). In certain embodiments, the sensor 14 includes sensing components in addition to, or instead of, the emitter 16 and the detector 18.

The sensor 14 also includes a sensor body 46 to house or carry the components of the sensor 14. In exemplary embodiments, the body 46 includes a backing, or liner, provided around the emitter 16 and the detector 18, as well as an adhesive layer (not shown) on the patient side. The sensor 14 may be reusable (such as a durable plastic clip sensor), disposable (such as an adhesive sensor including a bandage/liner at least partially made from hydrophobic materials), or partially reusable and partially disposable.

In the embodiment shown, the sensor 14 is communicatively coupled to the patient monitor 12. In certain embodiments, the sensor 14 may include a wireless module configured to establish a wireless communication 15 with the patient monitor 12 using any suitable wireless standard. For example, the sensor 14 may include a transceiver that enables wireless signals to be transmitted to and received from an external device (e.g., the patient monitor 12, a charging device, etc.). The transceiver may establish wireless communication 15 with a transceiver of the patient monitor 12 using any suitable protocol. For example, the transceiver may be configured to transmit signals using one or more of the ZigBee standard, 802.15.4x standards WirelessHART standard, Bluetooth standard, IEEE 802.11x standards, or MiWi standard. Additionally, the transceiver may transmit a raw digitized detector signal, a processed digitized detector signal, and/or a calculated physiological parameter, as well as any data that may be stored in the sensor, such as calibration data or coefficients, such as gamma coefficients, data relating to wavelengths of the emitters 16, or data relating to input specification for the emitters 16, as discussed below. Additionally, or alternatively, the emitters 16 and detectors 18 of the sensor 14 may be coupled to the patient monitor 12 via a cable 24 through a plug 26 (e.g., a connector having one or more conductors) coupled to a sensor port 29 of the monitor. In certain embodiments, the sensor 14 is configured to operate in both a wireless mode and a wired mode. Accordingly, in certain embodiments, the cable 24 is removably attached to the sensor 14 such that the sensor 14 can be detached from the cable to increase the patient's range of motion while wearing the sensor 14.

The patient monitor 12 is configured to calculate physiological parameters of the patient relating to the physiological signal received from the sensor 14. For example, the patient monitor 12 may include a processor configured to calculate the patient's arterial blood oxygen saturation, tissue oxygen saturation, pulse rate, respiration rate, blood pressure, blood pressure characteristic measure, autoregulation status, brain activity, and/or any other suitable physiological characteristics. Additionally, the patient monitor 12 may include a monitor display 30 configured to display information regarding the physiological parameters, information about the system (e.g., instructions for disinfecting and/or charging the sensor 14), and/or alarm indications. The patient monitor 12 may include various input components 32, such as knobs, switches, keys and keypads, buttons, etc., to provide for operation and configuration of the patient monitor 12. The patient monitor 12 may also display information related to alarms, monitor settings, and/or signal quality via one or more indicator lights and/or one or more speakers or audible indicators. The patient monitor 12 may also include an upgrade slot 28, in which additional modules can be inserted so that the patient monitor 12 can measure and display additional physiological parameters.

Because the sensor 14 may be configured to operate in a wireless mode and, in certain embodiments, may not receive power from the patient monitor 12 while operating in the wireless mode, the sensor 14 may include a battery to provide power to the components of the sensor 14 (e.g., the emitter 16 and the detector 18). In certain embodiments, the battery may be a rechargeable battery such as, for example, a lithium ion, lithium polymer, nickel-metal hydride, or nickel-cadmium battery. However, any suitable power source may be utilized, such as, one or more capacitors and/or an energy harvesting power supply (e.g., a motion generated energy harvesting device, thermoelectric generated energy harvesting device, or similar devices).

As noted above, in an embodiment, the patient monitor 12 is a pulse oximetry monitor and the sensor 14 is a pulse oximetry sensor. The sensor 14 may be placed at a site on a patient with pulsatile arterial flow, typically a fingertip, toe, forehead or earlobe, or in the case of a neonate, across a foot. Additional suitable sensor locations include, without limitation, the neck to monitor carotid artery pulsatile flow, the wrist to monitor radial artery pulsatile flow, the inside of a patient's thigh to monitor femoral artery pulsatile flow, the ankle to monitor tibial artery pulsatile flow, and around or in front of the ear. The patient monitoring system 10 may include sensors 14 at multiple locations. The emitter 16 emits light which passes through the blood perfused tissue, and the detector 18 photoelectrically senses the amount of light reflected or transmitted by the tissue. The patient monitoring system 10 measures the intensity of light that is received at the detector 18 as a function of time.

A signal representing light intensity versus time or a mathematical manipulation of this signal (e.g., a scaled version thereof, a log taken thereof, a scaled version of a log taken thereof, etc.) may be referred to as the photoplethysmograph (PPG) signal. In addition, the term "PPG signal," as used herein, may also refer to an absorption signal (i.e., representing the amount of light absorbed by the tissue) or any suitable mathematical manipulation thereof. The amount of light detected or absorbed may then be used to calculate any of a number of physiological parameters, including oxygen saturation (the saturation of oxygen in pulsatile blood, SpO2), an amount of a blood constituent (e.g., oxyhemoglobin), as well as a physiological rate (e.g., pulse rate or respiration rate) and when each individual pulse or breath occurs. For SpO2, red and infrared (IR) wavelengths may be used because it has been observed that highly oxygenated blood will absorb relatively less Red light and more IR light than blood with a lower oxygen saturation. By comparing the intensities of two wavelengths at different points in the pulse cycle, it is possible to estimate the blood oxygen saturation of hemoglobin in arterial blood, such as from empirical data that may be indexed by values of a ratio, a lookup table, and/or from curve fitting and/or other interpolative techniques.

Figure 2:
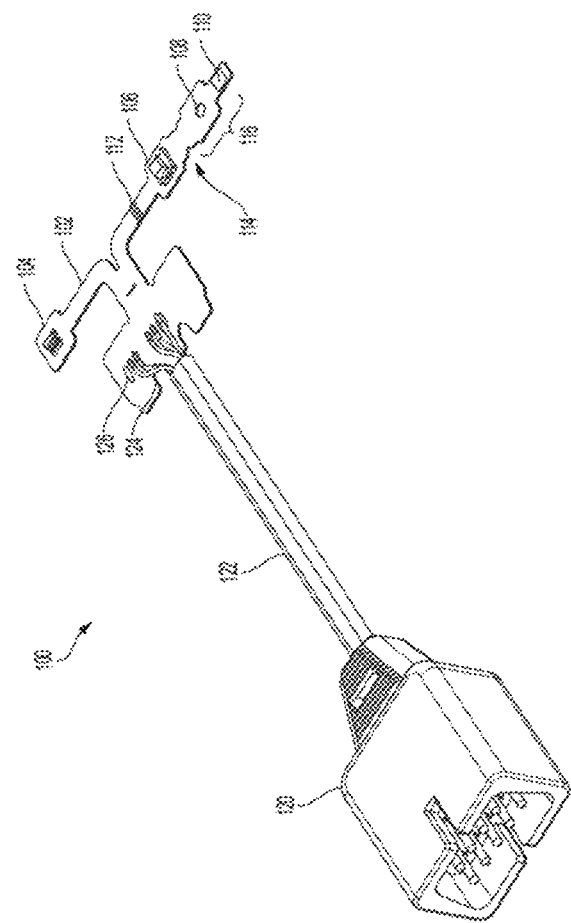
FIG. 2 illustrates a perspective view of an exemplary patient monitoring sensor.

Referring now to FIG. 2, an embodiment of a patient monitoring sensor 100 in accordance with an embodiment is shown. As may be seen, the shape or profile of various components may vary. The sensor 100 includes a body 102 that includes a flexible circuit. The sensor 100 includes one or more LEDs 104 (in this case a surface mount LED package with two LEDs) and one or more detectors 106 disposed on the body 102 of the sensor 100.

While any number of exemplary sensor designs are contemplated herein, in the illustrated exemplary embodiment, the body 100 includes a flap portion 116 that includes an aperture 108. The flap portion 116 is configured to be folded at a hinge portion 114 such that the aperture 108 overlaps the detector 106 to allow light to pass through. In one embodiment, the flap portion 116 includes an adhesive 110 that is used to secure the flap portion 116 to the body 102 after the flap portion 116 is folded at the hinge portion 114 using visual indicator 112 that is used to assure proper alignment of the flap portion 116 when folded at the hinge portion 114.

The sensor 100 includes a plug 120 that is configured to be connected to a patient monitoring system, such as the one shown in FIG. 1. The sensor 100 also includes a cable 122 that connects the plug 120 to the body 102 of the sensor 100. The cable 122 includes a plurality of wires 124 that connect various parts of the plug 120 to terminals 126 disposed on the body 102. The flexible circuit is disposed in the body 102 and connects the terminals 126 to the LED 104 and the detector 106. In addition, one of the terminals 126 connect a ground wire to the flexible circuit.

Figure 3:
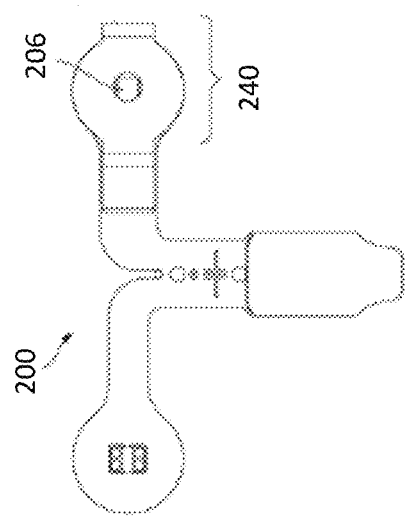
FIG. 3 illustrates a top elevation view of a portion of an assembled exemplary patient monitoring sensor.

Referring now to FIG. 3, a patient monitoring sensor 200 in accordance with an embodiment is shown. In exemplary embodiments, a faraday cage 240 is formed around the detector 206 by folding the flap portion 116 over a portion of the body 102 of the sensor 200.

Skin Pigmentation as a Tissue Characteristic During Pulse Oximetry

In exemplary embodiments, the present disclosure describes systems and methods for estimating or measuring subject (a patient's) pigmentation from recorded signals during pulse oximetry. As we have noted above, tissue characteristics, in this case, skin pigmentation, can contribute to tissue scattering or absorption of emitted light for one or more measured wavelengths of light.

Aspects described herein describe skin pigmentation as a tissue characteristic that can cause scattering or absorption of light during photoplethysmography (PPG) measurements. Other such tissue conditions include density, scarring, etc., can also cause or contribute to error. While certain mechanisms are described herein for correcting or for generating correction coefficients or algorithms to correct for skin pigmentation, such mechanisms may also be utilized to account for and/or to correct for other skin characteristics that can cause such scattering or absorption of light.

In exemplary aspects described herein, estimation based upon signal measurements can be performed in real time or periodically, to provide for dynamic correction of error due to skin characteristics that cause scattering or absorption of light, e.g., as a feedback loop or as part of a neural network.

Further, in exemplary embodiments, skin characteristics may be estimated or measured and/or correction of error may be generated or modified while the sensor is on a particular patient, for example, using a reflective mode to generate one or more signals to correct for error due to tissue scattering or absorption of light. In such embodiments, the reflective mode shines one or more wavelengths of LED light on the surface of the skin, with a photodetector sensing the reflected light off of the surface of the skin. The ratio of reflected light may be used to determine the skin characteristics (e.g., melanin) and/or to provide for error correction. In exemplary embodiments, the PPG sensor is a pulse oximeter operating in reflective mode.

Calibration Fixture/Calibration Mode for Measuring Spectral Skin Characteristics In exemplary embodiments, a pulse oximeter may be first used to get a reflected signal from the skin using a fixture (e.g., using a calibration fixture, e.g., an adhesive liner or other device, and calibration mode configured to cause reflection of the LED off of the skin), then switched over to transmission configuration (e.g., by removal of a liner/device). In other exemplary embodiments, the PPG sensor is a regional oximeter, such as an INVOS™ sensor. In further exemplary embodiments, a regional oximeter may be used in conjunction with a pulse oximeter, with the regional oximeter providing a measure of the reflected light.

Figure 4:
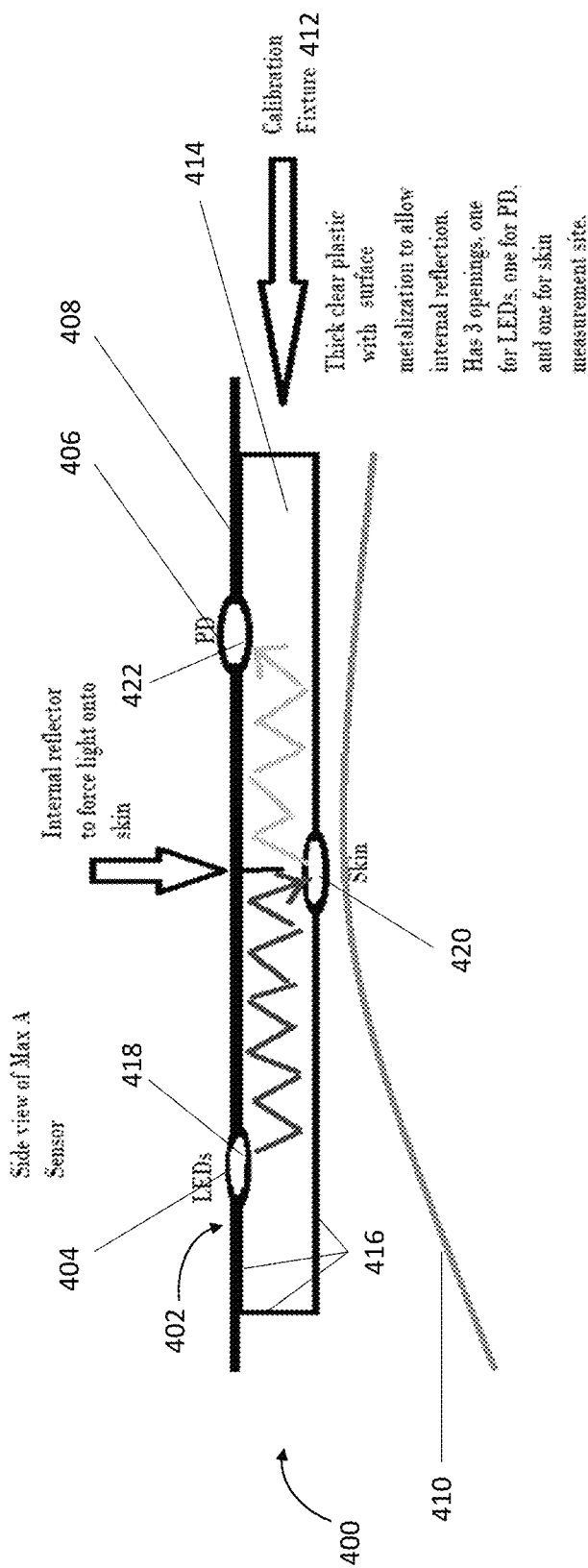
FIG. 4 is an exemplary schematic of a removable calibration fixture for estimation of spectral skin characteristics.

FIG. 4 illustrates an exemplary calibration fixture/sensor generally at 400. The sensor, shown generally at 402, includes at least one LED 404 (in exemplary embodiments, two to four LEDs) and at least on photodetector 406 (in exemplary embodiments two detectors) provided on a substrate 408, which may include a flex circuit, bandage, adhesive, etc. The skin of the patient is illustrated at 410.

The calibration fixture is illustrated generally at 412. In exemplary embodiments, the calibration fixture 412 is a thick, clear plastic material 414 with surface metallization at least around the borders (e.g., at points identified by 416) of the plastic material 414 to promote internal reflection within the fixture. In exemplary embodiments, three apertures are provided through the metallization, with a first 418 for the LED(s), a second 420 for the skin measurement site, and a third 422 for the detector(s). In exemplary embodiments, the fixture is used first and then removed, so that the sensor can measure the pigment level of the patient using a reflected signal before use as a pulse oximeter.

In exemplary embodiments using the reflective mode, the LED light is provided through aperture 418 within the fixture (by virtue of the internal reflectance) and shines on the surface of the skin via aperture 420. The photodetector senses that light reflected off the surface of the skin via aperture 422. The ratio of the reflected light is then used to determine the amount of melanin present in the skin.

Other exemplary embodiments also configure the sensor to be used in a reflective mode for a brief period before normal use. Using reflection instead of transmission (in accordance with normal use) provided benefit because reflected light it is not influenced by the thickness of the tissue as it may be for normal/transmission-based sensors.

In further exemplary embodiments the calibration fixture uses other mechanisms to provide a reflective signal on the skin, such as light pipes or fiber optics (which may have an internal reflectance), reflective coatings on a differently shaped clear fixture (e.g., a thick integrating sphere with 3 openings). In other exemplary embodiments, an internal reflector may be provided to coerce light to interrogate the tissue before making it to the detector.

In further exemplary embodiments, the calibration fixture is provided as a reusable fixture that can be used multiple times and/or for multiple sensors. In other exemplary embodiments, a calibration fixture is provided as a disposable portion that is initially attached to the sensor and is disposed of after tissue measurement/calibration. In other exemplary embodiments, the calibration fixture is configured dissolve or otherwise attenuate (e.g., as an adhesive, gel, etc.). In other exemplary embodiments, the sensor automatically switches from calibration mode into normal operational mode when the fixture is removed or attenuates.

Assessing Spectral Skin Characteristics Using at Least Three Wavelengths of Light In further exemplary embodiments, one or more additional wavelengths of light sensitive to skin pigmentation (e.g., a wavelength shifted by 5 nm or more) or other spectral tissue characteristics (in addition to e.g., initial red and infrared LEDs/wavelengths typically used in pulse oximeters) may be used to assess skin characteristics (e.g., pigmentation) by measuring $SpO_2$ using those one or more additional LEDs or wavelengths of light, comparing readings and applying a correction factor based on the difference in those readings. In exemplary embodiments, at least one additional LED is included that emits a wavelength of light sensitive to skin pigmentation. In other exemplary embodiments, different sets of LED pairs provides different $SpO_2$ readings for comparison and correction of error based on skin pigmentation.

In exemplary embodiments, a correction factor is applied to existing calibration coefficients based upon level of difference between the different estimates (two or more estimates) of $SpO_2$. In further exemplary embodiments, the correction factor is applied assuming that the difference is due to the presence of a difference in pigmentation (or other skin characteristic) between the subject of interest and a representative patient population from which the coefficients were developed.

In further exemplary embodiments, three wavelengths of light may also be generated from two optical sources (e.g., LEDs) by driving the LEDs at high and low voltages (e.g., at the extremes of their drive currents, low and high current states, in which there is a nominal wavelength shift between these extreme current levels), thus creating a shift in peak wavelength between readings made with high and low voltages so that at least two $SpO_2$ measurements are made with two pairs of peak wavelengths. The wavelength shift is due to internal heating in the LED that occurs at the higher current relative to the lower current. This heating increases the LED junction temperature and results in a shift in the peak wavelength to a higher value.

This exemplary embodiment also provides advantage by achieving measurements at additional wavelengths of light while relying on standard sensors using two LEDs. This also allows assessment of skin characteristics (e.g., pigmentation) by comparing readings and applying a correction factor based on the difference in those readings. In exemplary embodiments, a correction factor is applied to standard calibration coefficients based upon the level of disagreement, assuming that the difference is due to the presence of a difference in pigmentation (or other skin characteristic) between the subject of interest and a representative patient population from which the coefficients were developed.

In further exemplary embodiments, an adhesive liner material (or other material in the optical path that modifies/results in a shift of the original wavelengths from their nominal value) is used in a calibration step or interval, resulting in a shift of the original (e.g., the original red and IR wavelengths of the LEDs), generating a first pair of (new) peak wavelengths, with the liner removed to generate a second pair of (nominal) peak wavelengths. For example, FIG. 5 illustrates an exemplary sensor 500, including emitter(s) 510 and detector(s) 512, with a removable liner 514 at least covering the emitter(s). In exemplary embodiments, the liner material comprises an transparent liner provided on the sensor during the "calibration" interval, which is then removed during operation of the sensor.

In exemplary embodiments using red and IR emitters, the liner has optical characteristics that result in a shifting of the peak red and IR wavelengths as light passes through the liner into the subject's tissue. Measurements at these shifted wavelengths are used for the calculation of a correction factor based on skin pigmentation (or other skin characteristics). This also allows use of standard sensors, and allows assessment of skin characteristics (e.g., pigmentation) by comparing readings and applying a correction factor based on the difference in those readings.

In further exemplary embodiments, an adhesive (or gel layer) on the surface of the sensor and covering the emitter by itself has optical properties that modify the peak wavelengths of the emitter. The material has properties such that the physical features of the material that result in the optical characteristic that drives the wavelength shift will be attenuated over a period of time due to interaction between the material and the subject after the sensor is applied to the subject. In exemplary embodiments, this interaction is based on one or more of thermal, radiation, mechanical (e.g., pressure, shear, etc.), and chemical interaction with the subject's skin. In further exemplary embodiments, when those properties have attenuated, a second (or further) $SpO_2$ measurement is made. This allows assessment of skin characteristics (e.g., pigmentation) by comparing readings and applying a correction factor based on the difference in those readings.

Correcting for Spectral Skin Characteristic Errors by Modulating the Optical Signal Through Skin Further exemplary embodiments provide for correcting for spectral skin characteristic errors by modulating the optical signal through skin.

Pulse oximetry measures just the arterial blood and cancels out optical losses caused by the surrounding tissue by analyzing the modulated signal caused by the cardiac cycle. This modulated signal, R, can be described by the following equation:

$$R = \frac{(\ln(I_{out}(t_2)) - \ln(I_{out}(t_1)))_{\lambda_1}}{(\ln(I_{out}(t_2)) - \ln(I_{out}(t_1)))_{\lambda_2}}$$

Here, $t_1$ and $t_2$ represent measurements of the detected light at two different times; and $\lambda_1$ and $\lambda_2$ represent measurement at two unique wavelengths of light. An initial assumption may be made that the only component that changes R is the change in blood volume due to the cardiac cycle. However, the exemplary aspects of the present disclosure also recognize that if additional measurements are made, where the amount of skin that the light interacted with changed, then skin pigmentation could be determined.

In exemplary aspects, it may be considered that light reaching the photodetector of a pulse oximeter sensor passes through a series of N optical filters. Each optical filter can be considered a layer or type of tissue that the light has propagated through, per the below:

$$T_{Total} = \frac{I_{out}}{I_{in}} = T_1 \cdot T_2 \cdot T_3 \cdot \ldots T_N =$$

$$\eta_{LED-tissue} \cdot T_{pigment} \cdot T_{bone} \cdot T_{venous} \cdot T_{arterial} \cdot \ldots \cdot \eta_{detector-tissue}$$

In the above equation, the term η refers the coupling efficiency between the LED or the detector and the tissue. The absorbance, A, describes the amount of light that is loss and does not reach the photodetector, and is defined as the negative log of the transmission. Hence, the above equation can be rewritten as the following:

$$A_{Total} = -\log T_{Total} = -\log \eta_{LED-tissue} - \log T_{pigment} -$$

$$\log T_{bone} - \log T_{venous} - \log T_{arterial} \cdot \ldots \cdot -\log \eta_{detector-tissue}$$

As we have stated (and as is reflected in the equation for the modulated signal R), pulse oximetry makes two measurements at different times. Accordingly, the transmission terms in the above equation can be considered to be a function of time. To isolate the arterial component, two measurements can be made along the cardiac cycles, and assuming that the rest of the transmission terms do not change, then the above equation can be simplified to only include the arterial term:

$$dA_{Total}/dt = -d \log/dt(T_{arterial}(t))$$

This equation is the basis for the pulse oximeter when used with the equation for the modulated signal R. However, to determine skin pigmentation, in exemplary embodiments, two additional measurements can be made where the amount of light that interacts with the skin has been modulated. In this case, the above equation includes an addition term as the transmission due to the skin pigment has changed and is described by $A_{Total,2}$:

$$dA_{Total,2}/dt = -d \log/dt(T_{arterial}(t)) - d \log/dt(T_{pigment}(t))$$

To determine the skin pigmentation, the two equations immediately above can be added, which eliminates arterial component and allows for the just the pigmentation to be determined:

$$dA_{Total}/dt + dA_{Total,2}/dt = d \log/dt(T_{pigment}(t))$$

In exemplary embodiments, correction for errors due to skin characteristics that cause scattering or absorption of optical signals (e.g., pigmentation, according to the equation immediately above) are provided by modulating the optical signal through skin. In exemplary aspects, this relates to additional measurements made during pulse oximetry where the amount of light that interacts with the skin has been modulated. This may be done, e.g., by mechanically modulating the optical interaction with the skin, such as using an acoustic signal (e.g., ultrasound) that interacts with the skin, through motion, e.g., tapping the sensor, movement of the body with the sensor, one or more piezo-electrical crystal used to generate movement (e.g., one crystal near the detector and another near the emitter), etc. For example, FIG. 6 illustrates a sensor 600 having emitter(s) 610, detector(s) 612 and piezo-electrical crystals 614, 616 near the emitter(s) and detector(s), respectively. In exemplary embodiments, the sensor makes two independent readings where the light propagation through the skin has changed, allowing isolation/estimation of the optical signal due to such skin characteristics and correction of the error that is associated therewith (e.g., by modifying a calibration coefficient, curve or algorithm).

In further exemplary embodiments, light interaction with the skin is modulated optically. Skin tissue is optically anisotropic, with a g factor typically around 0.7 or 0.9, which implies that light has a strong preference for forward scatter in the skin. In exemplary aspects, light is injected from the sensor source into the skin at two different angles, providing different optical interactions with the skin. In exemplary embodiments, light is injected into the skin at different angles, providing different optical interaction with the skin. In exemplary embodiments, this is accomplished, e.g., by one or more of: multiple LEDs, lenses to control optical emission, a removable layer placed over LEDs of the sensor to redirect the light at a different angle, or the like.

Correcting for Errors Due to Spectral Tissue Characteristics for Hemoglobin Measurements In further embodiments, a system and method for measuring hemoglobin also utilizes correction for errors due to spectral tissue characteristics (e.g., skin pigmentation). In exemplary aspects, a PPG device, e.g., a pulse oximeter, utilizes red and infrared emitters (e.g., LEDs), as well as plural photodetectors, one with a responsivity to typical wavelengths, e.g., 500-600 nanometers (nm) to 900 nm or above, and one with responsivity to wavelengths greater than about 1000 nm.

For measure of hemoglobin, exemplary embodiments advantageously utilize at least one wavelength around or greater than 1000 nm, along with at least one detector capable of a response to wavelengths greater than 1000 nm, e.g., 1050 nm to 1550 nm (e.g., using an Indium Gallium Arsenide (InGaAs) or an Indium Gallium Arsenide Phosphide detector). In exemplary embodiments, a first source emits between about 600 nm and 900 nm, a second source emits about or above 1000 nm; and two detectors are placed in close proximity and placed in a parallel electrical circuit such that the output currents sum together. This provides a system and method that can provide optical detection over a large spectral bandwidth (e.g., 500-1550 nm, or more), allowing characterization of blood, including measure of total hemoglobin or other types of hemoglobin, e.g., carboxyhemoglobin, among others.

Figure 7:
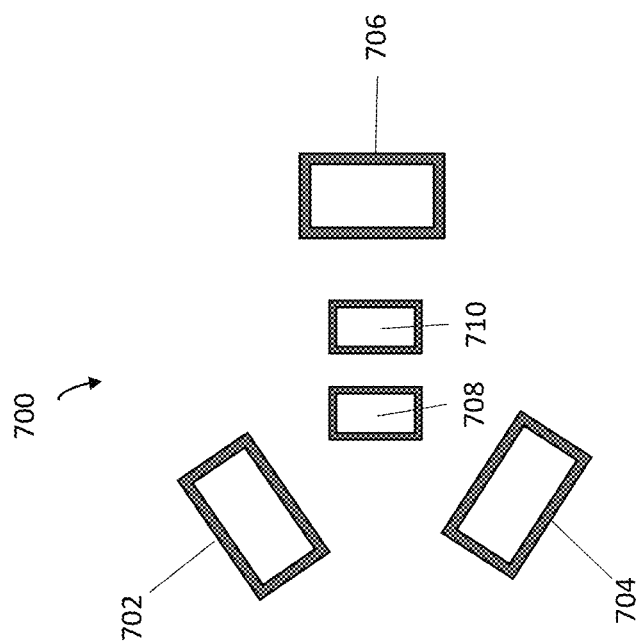
FIG. 7 is an exemplary schematic of a sensor arrangement for detecting hemoglobin.

FIG. 7 illustrates an exemplary schematic of a sensor design 700 incorporating an additional LED. In exemplary embodiments, LED 702 and LED 705 are standard red and IR LEDs, respectively. LED 706 is an LED that is configured to emit at larger wavelengths, e.g., near or above 1000 nm. In the illustrated exemplary embodiment, the LEDs are arranged in a circular pattern around two detectors, a first 708 configured to be responsive to typical wavelengths, e.g., 600-900 nm, and a second 710 configured to be responsive to wavelengths above about 1000 nm. This circular design optimizes space for hemoglobin measurements, placing the higher wavelength emitter near the higher wavelength detector and the more traditional emitters nearer the traditional detector. Additionally, the configuration allows for measure of a reflected optical signal from the skin for correction of error related thereto, in accordance with various exemplary aspects described herein. In addition, a current divider with a potentiometer may be provided to reduce the current from the reflected signals (in case the signals saturate the front end). In further exemplary embodiments, the system and method provide drive current control for each LED, allowing the LED to be set to any level.

Figure 8:
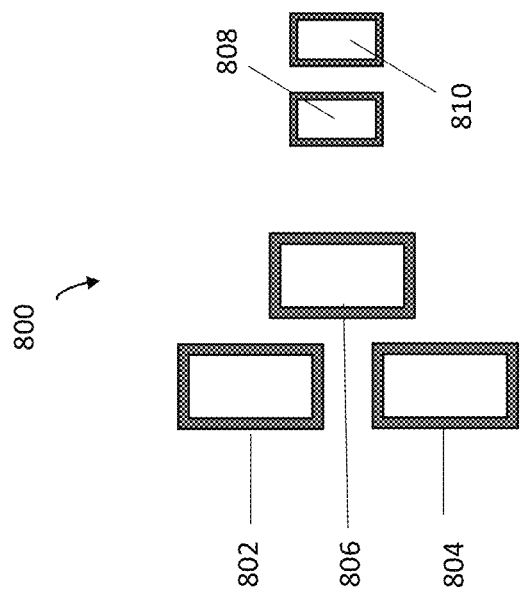
FIG. 8 is another exemplary schematic of a sensor arrangement for detecting hemoglobin.

FIG. 8 illustrates another exemplary sensor design 800, with LED 802 and LED 805 being standard red and IR LEDs, respectively. LED 806 is an LED that is configured to emit at larger wavelengths, e.g., near or above 1000 nm. In the illustrated exemplary embodiment, the LEDs are arranged near two detectors, a first 808 configured to be responsive to typical wavelengths, e.g., 600-900 nm, and a second 810 configured to be responsive to wavelengths above about 1000 nm. Additionally, the configuration allows for measure of a reflected optical signal from the skin for correction of error related thereto, in accordance with various exemplary aspects described herein. In addition, a current divider with a potentiometer may be provided to reduce the current from the reflected signals (in case the signals saturate the front end). In further exemplary embodiments, the system and method provide drive current control for each LED, allowing the LED to be set to any level.

As has been noted above, a reflected signal can be provided (via an arrangement in accordance with FIG. 7 or 8, or otherwise, to measure the optical signal level of reflected light and to concurrently provide a measure of the modulated optical signals from pulse oximetry data, with both the signal level and the modulated signal level being used to estimate the total hemoglobin in blood. In order to account for the effects of tissue scattering or absorption on the transmitted signal levels, the reflected optical signal measures the spectral characteristics of the tissue and is used to normalize the signal levels of the transmitted signals (to normalize relative differences between wavelength that are due to scattering losses of the tissue rather than blood). In such a way, exemplary techniques described herein may also be applied hemoglobin (or other hemoglobin type measurements, e.g., carboxyhemoglobin).

In some embodiments, the physiological monitoring system may comprise a sensor configured to store algorithm configuration data, which may be algorithm coefficient(s) and generate a photoplethysmography (PPG) signal. A port (e.g., a bi-directional input/output) may be communicatively coupled to the sensor and may be configured to receive an algorithm configuration data and the PPG signal from the sensor. At least one processor may be configured to configure or modify at least a part of the first algorithm based upon the algorithm configuration data received by a monitor from the sensor and to execute the first algorithm as configured or modified to determine at least one physiological parameter of a subject based on the PPG signal. The at least one processor may further be configured to delete the algorithm configuration data from the monitor, or deactivate the configuration or modifications of the first algorithm after the sensor becomes communicatively disconnected from the port. By providing algorithm configuration data on the sensor, new algorithm configurations may be provided to the monitor without the need for afield update of all installed monitors. Rather, the sensor may carry the most updated configuration data to the monitor for execution during patient monitoring, providing a higher quality calculation of patient parameters than otherwise would be possible without the algorithm configuration data. Additionally, different types of sensors may have different capabilities, which can be reflected in the algorithm configuration data they carry.

In some embodiments, a physiological sensor may be provided. The physiological sensor may comprise at least one light source configured to generate a light signal, at least one light detector configured to receive the light signal after the light signal has been attenuated by body tissue of a subject, and non-transitory memory (e.g., integrated memory) configured to store algorithm configuration data. The physiological sensor may further comprise a port. The port may comprise a bi-directional input/output port, a wireless interface, NFC (near field communication) interface, RFID link, one-wire interface, 12C, SPI, UART, or any other type of a port or communication interface. In some embodiments, the port may also have other capabilities. For example, the port may comprise an output of a photodetector capable of transmitting PPG data. The port may be configured to transmit the light signal to a physiological monitor that is communicatively coupled to the port and to transmit algorithm configuration data to the physiological monitor, which is configured to execute an executable code segment stored on the physiological monitor, as configured or modified by the algorithm configuration data received from the sensor to determine at least one physiological parameter of the subject based on the light signal. The algorithm configuration data may be deleted, or algorithm configurations or modifications may be deactivated after the physiological monitor becomes communicatively disconnected from the sensor. In some embodiments, the physiological monitor may become communicatively disconnected from the sensor, for example, when the sensor is physically disconnected form the physiological monitor, or when the sensor is moved out of the wireless range of the physiological monitor.

In some embodiments a physiological monitoring system may be provided. The physiological monitoring system may comprise a sensor that is configured to store algorithm configuration data and generate a photoplethysmographic (PPG) signal. The physiological monitoring system may further comprise a physiological monitor. The physiological monitor may comprise a port that is communicatively coupled to the sensor and is configured to receive the algorithm configuration data and the PPG signal from the sensor. The physiological monitor may comprise non-transitory memory configured to store a sequence of ordered algorithm stages wherein one of the algorithm stages comprises a configurable algorithm stage, the configurable algorithm stage comprising a plurality of alternative executable code segments.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A method for calibrating for errors dependent upon spectral characteristics of tissue for a medical device, comprising:
    providing a medical device including a sensor having at least one red LED configured for LED emission of a red wavelength through tissue and at least one infrared LED configured for LED emission of an infrared wavelength through tissue;
    operating the sensor in reflectance mode to generate a first $SpO_2$ reading and estimating error due to spectral characteristics of skin therefrom;
    operating the sensor in transmissive mode to generate a second SpO2 reading; and
    applying a correction to a pulse oximetry transmissive mode measurement to correct for the error dependent upon the estimated spectral characteristic of tissue.

2. A method in accordance with claim 1, wherein the correction includes a new power ratio, gamma or other calibration coefficients or equations, or includes a modification of existing power ratio, gamma or other calibration coefficients or equations.

3. A method in accordance with claim 2, wherein the new power ratio, gamma or other calibration coefficients or equations is stored in memory on the medical sensor, or where the correction modifies existing power ratio, gamma or other calibration coefficients or equations stored in memory on the medical sensor.

4. A method in accordance with claim 1, wherein the reflectance mode is provided by a removable or attenuating calibration fixture.

5. A method in accordance with claim 4, wherein the reflectance mode is provided by a removable calibration fixture that includes: a transparent material with a reflective coating promoting internal reflectance, having plural apertures through the reflective coating to provide transmission of the optical signal from the emitter through the transparent material, off of the skin and to the detector; light pipes or fiber optics; internal reflectors configured to coerce light to interrogate tissue prior to the detector; or a disposable or attenuating liner, adhesive or gel.

6. A method in accordance with claim 1, wherein the sensor emits at least three wavelengths of light, with at least the third wavelength of light being sensitive to skin pigmentation or other spectral tissue characteristics that cause scattering or absorption of light, and wherein correction is applied based upon a level of difference between two or more estimates of $SpO_2$ using at least the third wavelength of light.

7. A method in accordance with claim 6, wherein at least a third wavelength is generated by one of: including at least a third LED; driving two LEDs at high and low current states, in which there is nominal wavelength shift for the two LEDs between these high and low current levels; and including an adhesive liner, an adhesive layer, or a gel layer with optical characteristics that result in a shifting of peak red and IR LED emitted wavelengths used in a calibration step or interval, with a subsequent measurement after removal or attenuation of the liner or layer.

8. A method in accordance with claim 1, wherein the amount of light that interacts with the skin is modulated manually or optically to determine skin pigmentation.

9. A method in accordance with claim 8, wherein manual modulation includes use of an acoustic signal, force on the sensor, or movement of a patient's body, and wherein optical modulation includes one or more of: plural LEDs; lenses to control optical emission; and removable layers placed over LEDs of the sensor to redirect emitted light to a different angle.

10. A method in accordance with claim 1, wherein the medical device includes a sensor having at least a third LED configured to emit a wavelength above 1000 nm, as well as a second detector responsive to wavelengths above 1000 nm, wherein the reflected signal is normalized for a hemoglobin measurement to correct for errors due to scattering or absorption losses of tissue.

11. A system for calibrating for errors dependent upon spectral characteristics of tissue for a medical device, comprising:
    a medical device including a sensor having:
        at least one red LED configured for LED emission of a red wavelength through tissue; and
        at least one infrared LED configured for LED emission of an infrared wavelength through tissue;
    a processor in operative communication with the sensor, the processor configured to:

estimate a spectral characteristic of tissue providing error due to scattering or absorption of emitted light by operating the sensor in reflectance mode to generate a first $SpO_2$ reading and estimating error due to spectral characteristics of skin therefrom;

operating the sensor in transmissive mode to generate a second SpO2 reading; and applying a correction to a pulse oximetry transmissive mode measurement to correct for the error dependent upon the estimated spectral characteristic of tissue.

12. A system in accordance with claim 11, wherein the correction includes a new power ratio, gamma or other calibration coefficients or equations, or includes a modification of existing power ratio, gamma or other calibration coefficients or equations.

13. A system in accordance with claim 12, wherein the new power ratio, gamma or other calibration coefficients or equations is stored in memory on the medical sensor, or where the correction modifies existing power ratio, gamma or other calibration coefficients or equations stored in memory on the medical sensor.

14. A system in accordance with claim 11, wherein the reflectance mode is provided by a removable or attenuating calibration fixture.

15. A system in accordance with claim 14, wherein the reflectance mode is provided by a removable calibration fixture that includes: a transparent material with a reflective coating promoting internal reflectance, having plural apertures through the reflective coating to provide transmission of the optical signal from the emitter through the transparent material, off of the skin and to the detector; light pipes or fiber optics; internal reflectors configured to coerce light to interrogate tissue prior to the detector; or a disposable or attenuating liner, adhesive or gel.

16. A system in accordance with claim 11, wherein the sensor emits at least three wavelengths of light, with at least the third wavelength of light being sensitive to skin pigmentation or other spectral tissue characteristics that cause scattering or absorption of light, and wherein correction is applied based upon a level of difference between two or more estimates of $SpO_2$ using at least the third wavelength of light.

17. A system in accordance with claim 16, wherein at least a third wavelength is generated by one of: including at least a third LED; driving two LEDs at high and low current states, in which there is nominal wavelength shift for the two LEDs between these high and low current levels; and including an adhesive liner, an adhesive layer, or a gel layer with optical characteristics that result in a shifting of peak red and IR LED emitted wavelengths used in a calibration step or interval, with a subsequent measurement after removal or attenuation of the liner or layer.

18. A system in accordance with claim 11, wherein the amount of light that interacts with the skin is modulated manually or optically to determine skin pigmentation.

19. A system in accordance with claim 18, wherein manual modulation includes use of an acoustic signal, force on the sensor, or movement of a patient's body, and wherein optical modulation includes one or more of: plural LEDs; lenses to control optical emission; and removable layers placed over LEDs of the sensor to redirect emitted light to a different angle.

20. A system in accordance with claim 11, wherein the medical device includes a sensor having at least a third LED configured to emit a wavelength above 1000 nm, as well as a second detector responsive to wavelengths above 1000 nm, wherein the reflected signal is normalized for a hemoglobin measurement to correct for errors due to scattering or absorption losses of tissue.

* * * * *